(12) United States Patent
Steinwender

(10) Patent No.: US 7,828,129 B2
(45) Date of Patent: Nov. 9, 2010

(54) MAGNETORHEOLOGICAL CLUTCH HAVING LAMINATION BANDS

(75) Inventor: Herbert Steinwender, Raaba (AT)

(73) Assignee: MAGNA Drivetrain AG & Co KG, Lannach (AT)

( * ) Notice: Subject to any disclaimer, the term of this patent is extended or adjusted under 35 U.S.C. 154(b) by 820 days.

(21) Appl. No.: 11/579,987

(22) PCT Filed: May 17, 2005

(86) PCT No.: PCT/AT2005/000165

§ 371 (c)(1),
(2), (4) Date: Jan. 4, 2007

(87) PCT Pub. No.: WO2005/111454

PCT Pub. Date: Nov. 24, 2005

(65) Prior Publication Data

US 2008/0135367 A1    Jun. 12, 2008

(30) Foreign Application Priority Data

May 17, 2004    (AT) ............................... GM359/2004

(51) Int. Cl.
*F16D 37/02*    (2006.01)
(52) U.S. Cl. ................. 192/21.5; 192/58.41; 188/267.2
(58) Field of Classification Search ............... 192/21.5, 192/58.41; 188/267.1, 267.2
See application file for complete search history.

(56) References Cited

U.S. PATENT DOCUMENTS

| | | | | |
|---|---|---|---|---|
| 2,543,394 A | * | 2/1951 | Winther | 192/21.5 |
| 2,615,945 A | * | 10/1952 | Jaeschke | 310/103 |
| 2,709,507 A | * | 5/1955 | Trickey | 192/21.5 |
| 2,745,527 A | * | 5/1956 | Winther | 192/21.5 |
| 2,818,148 A | * | 12/1957 | Winther | 192/21.5 |
| 3,266,606 A | * | 8/1966 | Barrett | 192/21.5 |

(Continued)

FOREIGN PATENT DOCUMENTS

EP    0940286 A    9/1999

(Continued)

OTHER PUBLICATIONS

International Search Report for PCT/AT2005/000165, ISA/EP, Rijswijk, mailed Sep. 15, 2005.

*Primary Examiner*—Rodney H Bonck
*Assistant Examiner*—Terry Chau
(74) *Attorney, Agent, or Firm*—Harness, Dickey & Pierce, P.L.C.

(57) ABSTRACT

A magnetorheological clutch comprises a stationary part, a rotating primary part with primary laminated strips and a secondary part with secondary laminated strips, whereby a controllable magnetic field acts upon the magnetorheological fluid. The aim of the invention is to allow transmission of a highest possible torque in a smallest possible space and with minimal power consumption. Said aim is achieved, whereby a number of solenoid coils, each having a first yoke with a substantially radial winding axis, are alternately oppositely polarized; the first yokes have cylindrical front faces, whereby the magnetic field lines radially enter and exit said yokes, the primary laminated strips and secondary laminated strips form closed cylindrical envelopes and second outer and inner yokes are provided radially outside of and radially inside the first yokes, whereby the magnetic field lines radially enter the second yokes and radially exit said yokes in the opposite direction.

7 Claims, 7 Drawing Sheets

U.S. PATENT DOCUMENTS

| | | | | |
|---|---|---|---|---|
| 3,358,798 A | * | 12/1967 | Janson | 192/21.5 |
| 4,682,676 A | * | 7/1987 | Murata | 192/21.5 |
| 5,823,309 A | * | 10/1998 | Gopalswamy et al. | 192/21.5 |
| 5,896,965 A | * | 4/1999 | Gopalswamy et al. | 192/21.5 |
| 5,967,273 A | * | 10/1999 | Hampton | 192/21.5 |
| 6,581,739 B1 | * | 6/2003 | Stretch et al. | 192/21.5 |
| 7,461,731 B2 | * | 12/2008 | Steinwender | 192/21.5 |
| 7,588,131 B2 | * | 9/2009 | Steinwender | 192/21.5 |
| 2001/0041637 A1 | * | 11/2001 | Leeper | 475/85 |
| 2005/0121269 A1 | * | 6/2005 | Namuduri | 188/267.1 |
| 2005/0188690 A1 | * | 9/2005 | Namuduri et al. | 60/435 |

FOREIGN PATENT DOCUMENTS

| | | |
|---|---|---|
| GB | 191019786 A | 0/1911 |
| GB | 783 060 A | 9/1957 |
| JP | 56138527 A | 10/1981 |
| RU | 94015535 A1 | 6/1996 |
| WO | WO 2004/040157 | 5/2004 |

* cited by examiner

MAGNETORHEOLOGICAL CLUTCH HAVING LAMINATION BANDS

CROSS-REFERENCE TO RELATED APPLICATIONS

This application is a National Stage of International Application No. PCT/AT2005/000165, filed May 17, 2005, and which claims the benefit of Austrian Utility Model No. GM 359/2004, filed May 17, 2004. The disclosures of the above applications are incorporated herein by reference.

FIELD

The invention relates to a magnetorheological clutch comprising a stationary part, a primary part having primary lamination bands and a secondary part having secondary lamination bands, wherein at least one of the primary part and the secondary part coaxially rotates relative to the respective other part, with a working space being formed between the primary part and the secondary part which contains a magnetorheological fluid and in which primary lamination bands and secondary lamination bands alternate sequentially in the radial direction and with a regulatable magnetic field acting on the magnetorheological fluid. To distinguish between the primary part and the secondary part, it is assumed that the secondary part engages around the primary part and the working space, provided nothing else is described.

BACKGROUND

The statements in this section merely provide background information related to the present disclosure and may not constitute prior art.

The power consumption and the construction size are critical and must therefore be minimized for the use of a clutch of this type in the drivetrain of a power vehicle. There are also further demands: A regulation range of the transmitted torque which is so wide that a driving off from stationary is possible without slip, on the one hand, and complete separation is possible, on the other hand, also for noise reasons; and, finally, fast response to be compatible with electronic drive regulation systems (ESB, ABS, etc.).

A clutch of this type is known from EP 940 286 A2. The magnetic field is generated by a coil fixed with respect to the housing here. The field lines are relatively long due to the manner of construction of the magnetic coil with its yoke, which reduces the size of the active part of the magnetic field, that is its part acting on the magnetorheological liquid. An air gap thereby also arises between its yoke and the rotating parts, in particular the disks, which has to have a substantial width for tolerance reasons. The magnetic field lines are thereby interrupted and the magnetic field acting on the magnetorheological liquid is further weakened.

SUMMARY

The object underlying the invention consists of improving a clutch of this type such that a torque can be transmitted which is as high as possible in the smallest possible working space and with minimal power consumption.

This is achieved by an even number of magnetic coils with a radial winding axis, with adjacent magnetic coils being oppositely poled, and their arrangement within the working space containing the magnetorheological fluid and the magnetic field lines emerge out of or enter into the first yokes substantially in the radial direction ensure the shortest closed field lines which act over the larger part of their length in the working space. The lamination bands can be arranged either inside or outside as well as inside and outside the magnetic coils, which is meant by at least on one side. The fact that the primary lamination bands and the secondary lamination bands are closed cylindrical jackets provides low axial dimensions of the clutch and a particularly favorable shape of the magnetic field. This favorable shape of the magnetic field is also served by the outer and the inner second yokes which divert the magnetic field lines and bound the working space outwardly and inwardly.

The further features also effect a shortening and homogenization of the magnetic field lines overall, a maximization of their active part and a minimization of magnetic short circuit. The field lines run in one direction radially, are reversed at the two second yokes and then run radially in the opposite direction. The flux density of the field lines closed per se is thus largely constant.

To combine the first yokes compactly and to permit a rash assembly, they are combined to form a first yoke ring with their magnetic coils. Furthermore, to restrict the creation of eddy currents in the yokes, they are composed of metal sheets or they comprise a sintered material of high magnetic permeability. The magnetic field can thereby be built up and phased out again fast, which permits the fast regulation required for electronic driving aids and braking aids.

The first yokes can be rotationally fixedly connected to the primary part or alternatively to the secondary part and the second yokes can be rotationally fixedly connected to the secondary part or alternatively to the primary part. Because the cylindrical lamination bands are connected to the primary or secondary part at one of their two rims, both arrangements are equally favorable.

In a particularly favorable embodiment, primary lamination bands and secondary lamination bands are arranged outside and inside the first yokes and the two yokes have parallel and coaxial cylindrical surfaces facing the lamination bands. The first yoke ring is thus arranged approximately at the radial center between the lamination bands, whereby the number of the lamination bands close to the generator of the magnetic field doubles and the magnetic field is thus optimally utilized.

In another embodiment, the primary lamination bands and secondary lamination bands are arranged outside the first yokes and the inner second yoke is connected to the first yokes. This arrangement is more favorable at very high speeds because the centrifugal force acting on the first yokes is smaller.

In an advantageous further development, the lamination bands are of a material of high magnetic permeability and have zones of low magnetic permeability extending distributed over their periphery in the axial direction. These zones reduce the magnetic short circuit within the lamination bands. These zones can comprise rows of sequential holes which are preferably arranged such that the rows of sequential holes are steep helixes. The rows are therefore inclined at an acute angle to a generatrix of the cylindrical jacket (which the lamination bands form). Torque irregularities are thereby reduced.

It also lies within the framework of this measure to combine a row of sequential holes to form slits. When the extent of the zones of low magnetic permeability of the primary lamination bands differs from that of the zones of the secondary lamination bands, the arising of vibrations or of noises is restricted.

In a modified embodiment, the first yokes and the inner second yoke are, finally, fixedly connected to the housing and the outer second yoke is connected to the secondary part and has cylindrical surfaces parallel and coaxial to the lamination bands at its inner side facing the lamination bands. Thanks to the first yokes, which are fixed to the housing, no sliding contacts are required for the energy supply to the magnetic coils; however, at the price of an air gap which can, however, be kept very small due to the arrangement in accordance with the invention. The clutch thus has a very remote similarity to an electric motor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
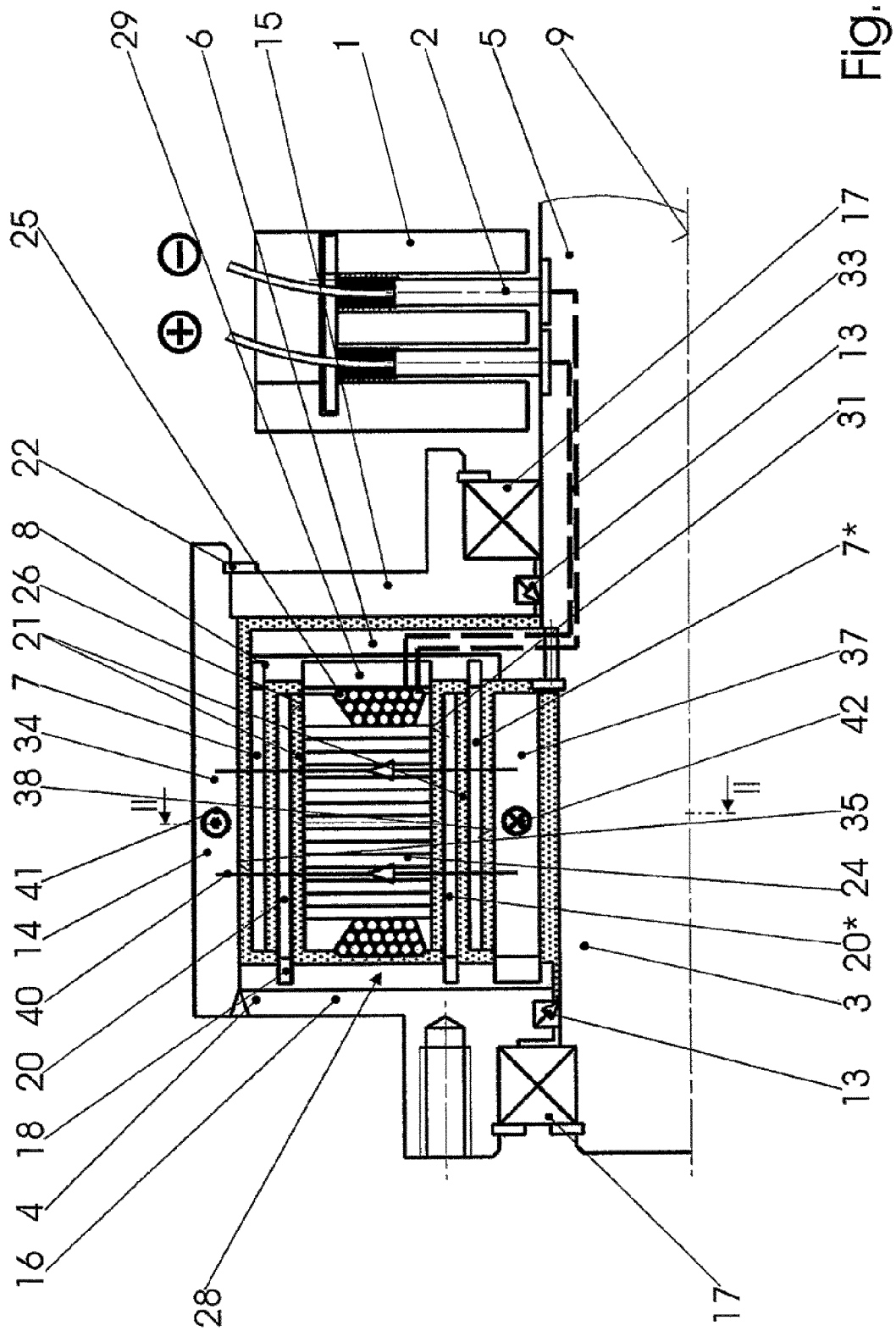
FIG. 1 illustrates a longitudinal section of the clutch in accordance with the invention in a first embodiment.

The following description is merely exemplary in nature and is not intended to limit the present disclosure, application, or uses. It should be understood that throughout the drawings, corresponding reference numerals indicate like or corresponding parts and features.

In FIG. 1, the housing is omitted and is only indicated by the stationary part 1 which carries sliding contacts 2 for the power supply. The clutch itself permits the controllable transmission of a torque from a primary part 3 with a primary shaft 5 to a secondary part 4. The primary part 3 is formed by a disk 6 rotationally fixedly connected to the primary shaft 5 and made from a material of low magnetic permeability, by a number of primary lamination bands 7 and by the generator of the controllable magnetic field to be described further below. The primary lamination bands 7 are each the jacket of a cylinder with the geometrical axis 9 whose one margin 8 is fixedly connected to the disk 6.

The secondary part 4 is likewise rotatable about the axis 9, that is coaxially; it comprises a jacket 14 and bearing plates 15, 16 which engage around the primary part 3 and are sealed with respect to it by means of seals 13. The bearing plates 15, 16 furthermore carry the bearings 17 in which the primary part 3 is guided with respect to the secondary part 4. The bearings of the secondary part in the housing 1 are not shown. The bearing plate 16 of the secondary part 4 comprises at least partly a material of low magnetic permeability; the margins 18 of the cylindrical secondary lamination bands 20 are fixedly mounted to it. A working space 21 is thus formed between the primary part 3 and the secondary part 4 and contains a magnetorheological fluid and primary lamination bands 7 and secondary lamination bands 20 of radii reducing in alternating order. A circlip 22 or the like can be provided for the dismantlable connection of the other bearing plate 15 to the jacket 14.

In the embodiment described, a number of first yokes 24 with magnetic coils 25 whose winding axis is radial and which are oppositely poled sequentially in the peripheral direction are located approximately in the radial center between the pairs of primary and secondary lamination bands 7, 20. This means that a first yoke 24 with a magnetic coil 25 is followed in the peripheral direction by a further first yoke 24' with a reversely poled magnetic coil 25', and so on, so that an even number of first yokes is present distributed over the periphery (see FIGS. 2, 3).

The first yokes 24, 24' have outer cylindrical end faces 26, with the axis of rotation 9 also being the geometric axis of the cylinder. The space between the individual first yokes can be filled with a material of low magnetic permeability or can be combined in another manner to form a closed ring 28 which is fixedly connected at its one-sided foot part 29 to the disk 6. The power supply 33 from the sliding contact 2 to the magnetic coils 25, 25' also takes place by this connection. The first yokes 24 also have inner cylindrical end faces 31, likewise having the axis of rotation 9 as the cylinder axis.

Furthermore, two second yokes are provided, and indeed an outer second yoke 34 and an inner second yoke 37, both made of a material of high magnetic permeability. The outer second yoke 34 is a ring which is preferably simultaneously the jacket of the secondary part and has an inner coaxial cylindrical surface 35 which is equidistant to the outermost lamination band 7, 20 and bounds the working space 21 to the outside. The inner second yoke 37 is rotationally fixedly connected to the bearing plate 16 of the secondary part 4 and has an outer coaxial cylindrical surface 38. Further pairs of lamination bands 7*, 20* are located between the first yokes 24 and the inner second yoke 37. In the embodiment shown, only one primary and one secondary lamination band 7, 20 respectively is drawn outside the yoke ring 28 and one pair 7*, 20* is drawn inside the yoke ring 28; in most cases, however, a plurality of such pairs are necessary for the transmission of a high torque.

The described arrangement of magnetic coils and yokes generates a magnetic field which is represented by the field lines 40, 40', 41, 42. It can best be recognized in FIG. 2 that the magnetic coil 25 in the first yoke 24 generates radially outwardly leading field lines 40 which are deflected after crossing through the working space 21 and the lamination bands 7, 20 in the outer second yoke 34 so that they merge into radially inwardly leading field lines 40'. After a repeated penetration of the lamination bands 7, 20 and of the first yoke 24' which is adjacent to the first yoke 24 and whose magnetic coil 25' has a reversed poling, they again penetrate the working space 21 with the lamination bands 7*, 20* (they are radially inside the yoke ring 28). In the inner second yoke 37, they are then again diverted in the peripheral direction and form field lines again directed outwardly in the first yoke 24. In all embodiments, both the first yokes 24 and the second yokes 34, 37 comprise mutually contacting metal sheets in whose plane the field lines extend; or they comprise a material with a high magnetic permeability and poor electrical conductivity.

Figure 4:
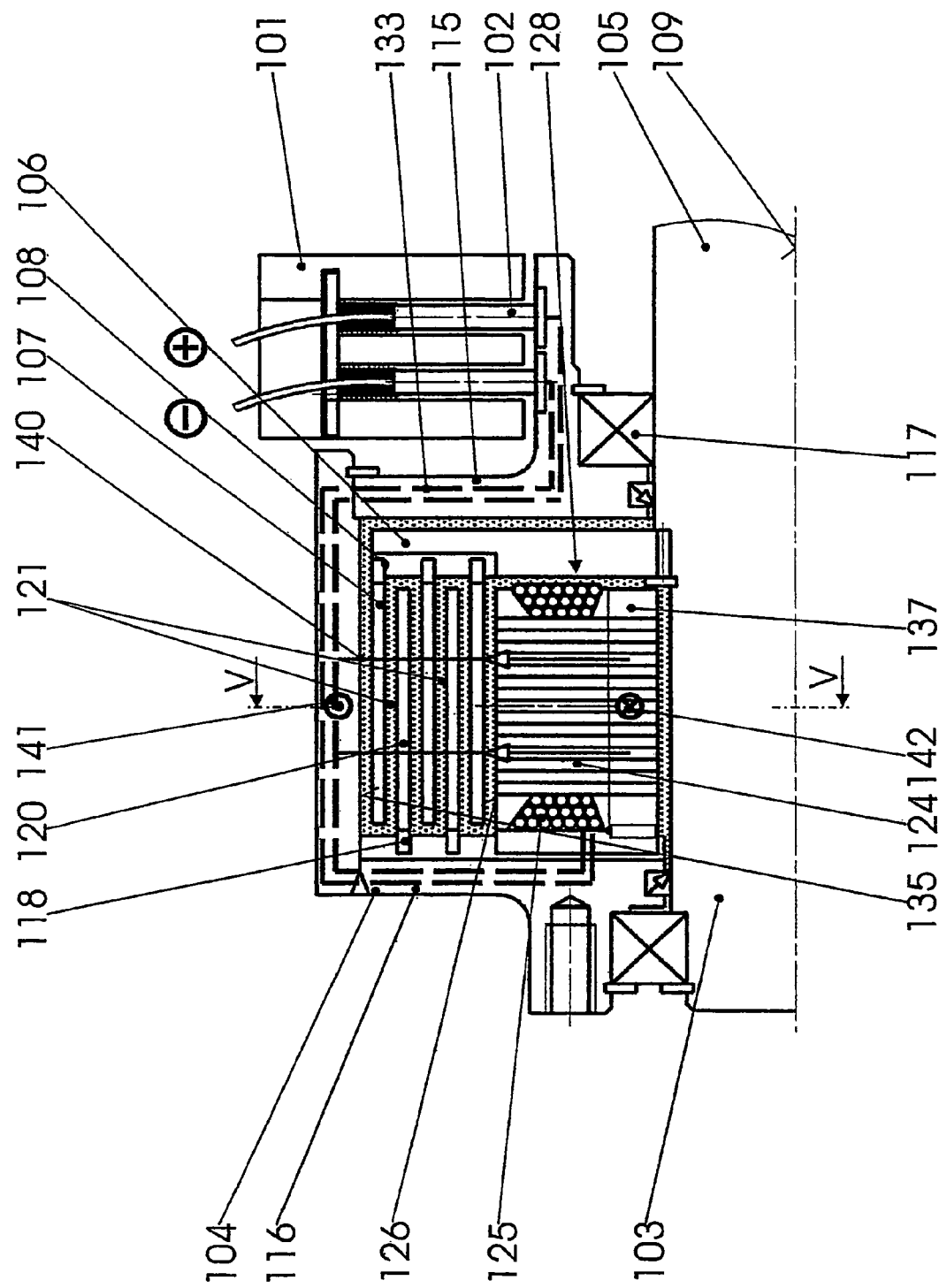
FIG. 4 is a longitudinal section of the clutch in accordance with the invention in a second embodiment.
Figure 5:
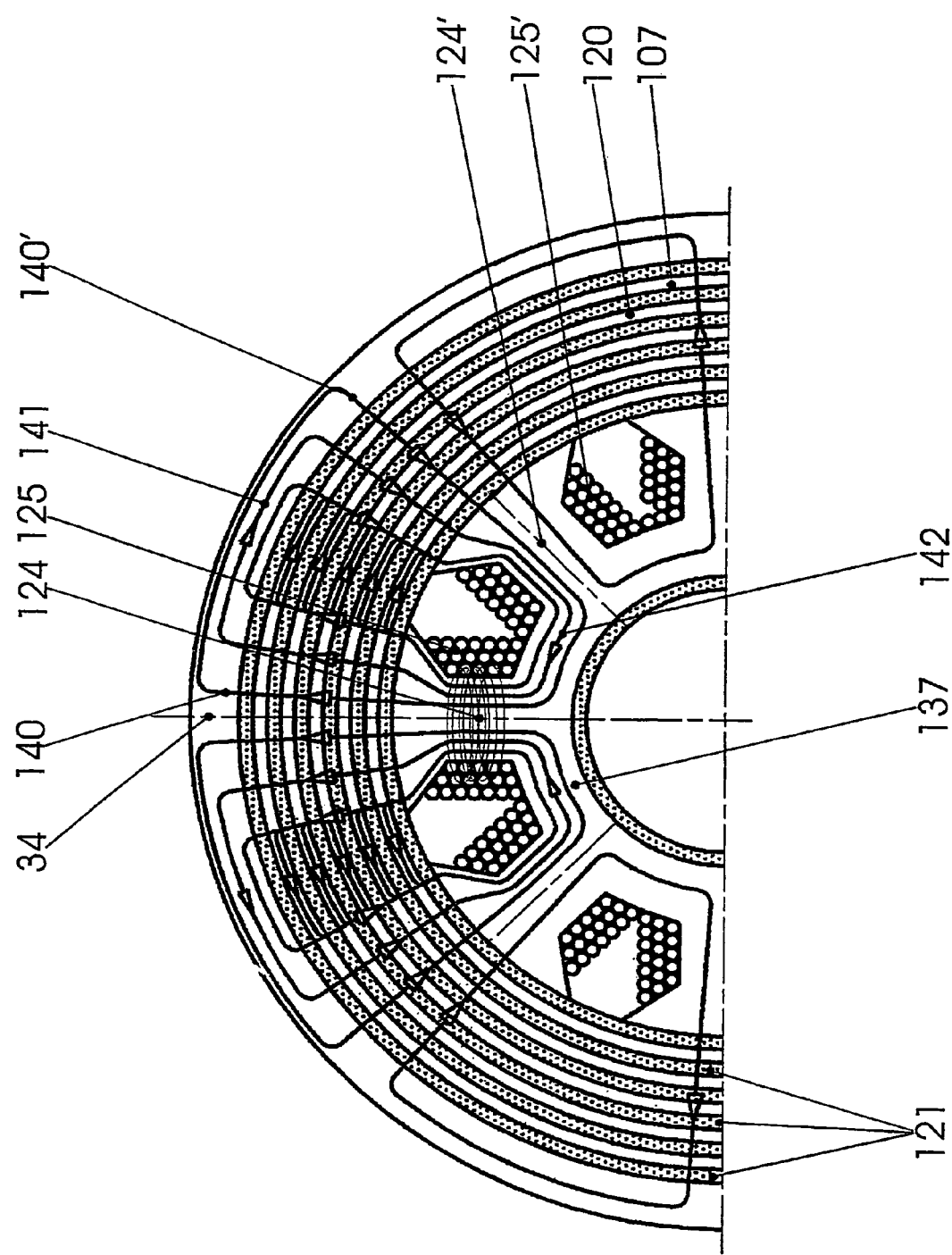
FIG. 5 is a section according to V-V in FIG. 4.

In the embodiment of FIGS. 4, 5, in which the reference numerals of corresponding parts are increased by 100, the difference is that the yoke ring 128 forms the inner boundary of the working space 121, all primary and secondary lamination bands 107, 120 are therefore outside. This brings along the fact that the first yokes 124 can be made in one piece with the inner second yoke 137. In the embodiment shown, the yoke ring 128 is rotationally fixedly connected to the secondary part 104, so that the power supply 133 also leads from the sliding contact 102 via the plates 115, 116 and the jacket 134 to the magnetic coils 125. The poling of adjacent magnetic coils 125, 125' is therefore also opposite here.

Figure 6:
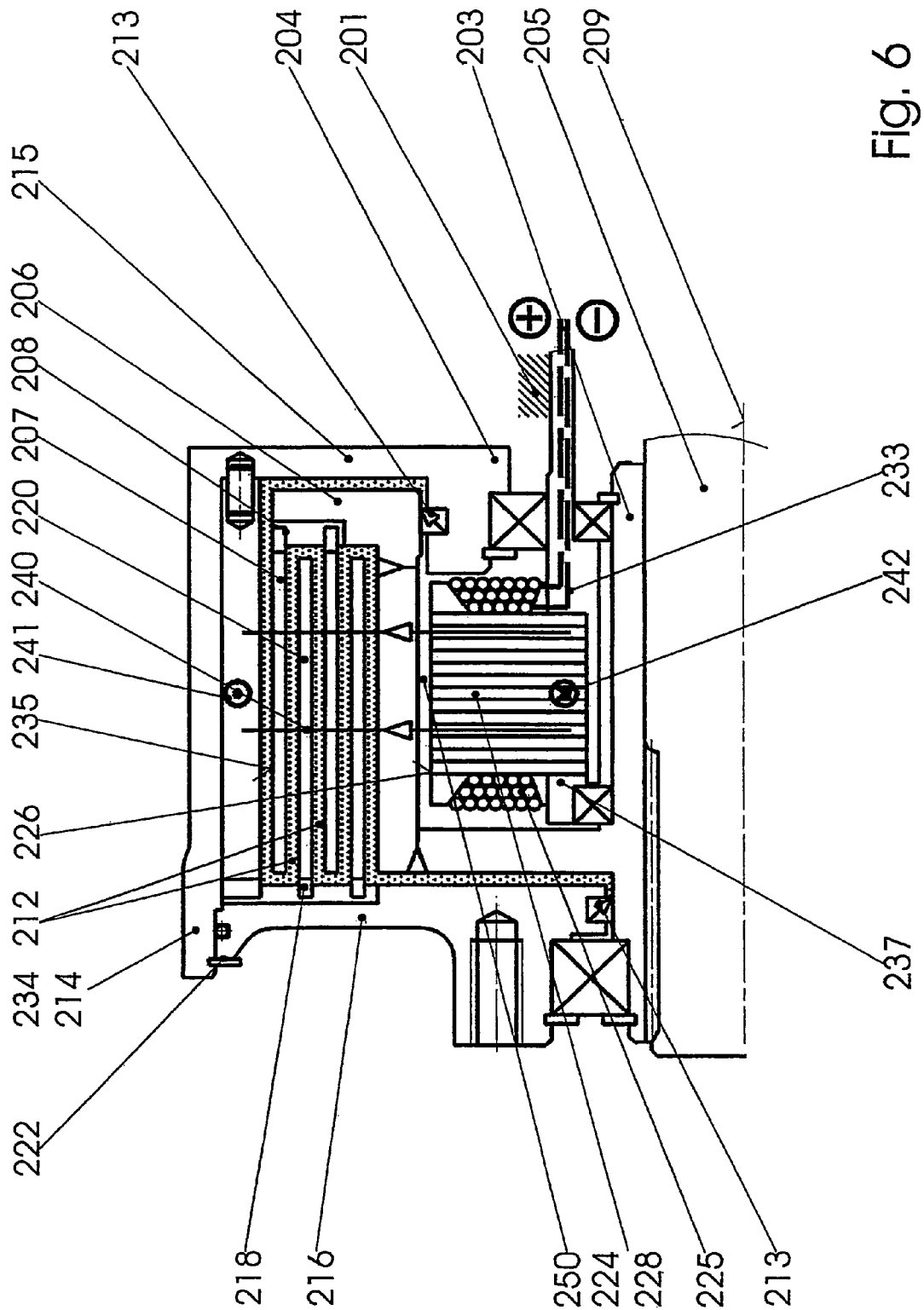
FIG. 6 is a longitudinal section of the clutch in accordance with the invention in a third embodiment.

The somewhat more remote embodiment of FIG. 6 in which the corresponding reference numerals are increased by 200, differs from the preceding in that the magnetic coils 225 of the first yokes 224 are fixedly connected to the stationary part 201 and thus do not rotate. The inner second yoke 237 is accordingly again made in one piece with the first yokes 224. An air gap 250 is present here between the first yoke 224 and the primary part 206. Due to the construction, however, this can be kept very small; in addition, the torque which can be transmitted is larger with respect to the magnetic field strength, because the lamination bands 207, 220 lie at a larger distance from the axis of rotation 209.

Figure 2:
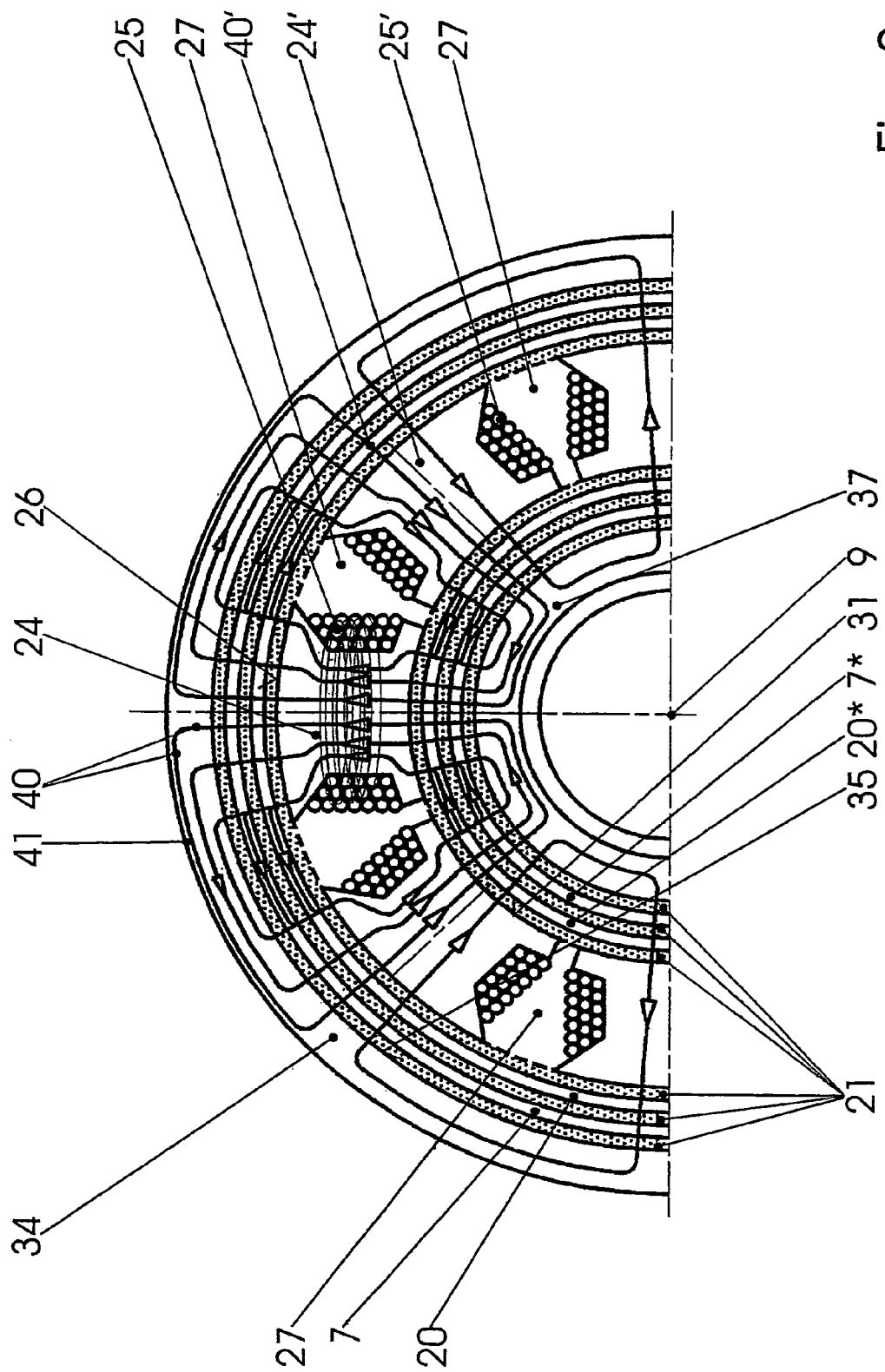
FIG. 2 is a section according to II-II in FIG. 1.
Figure 3:
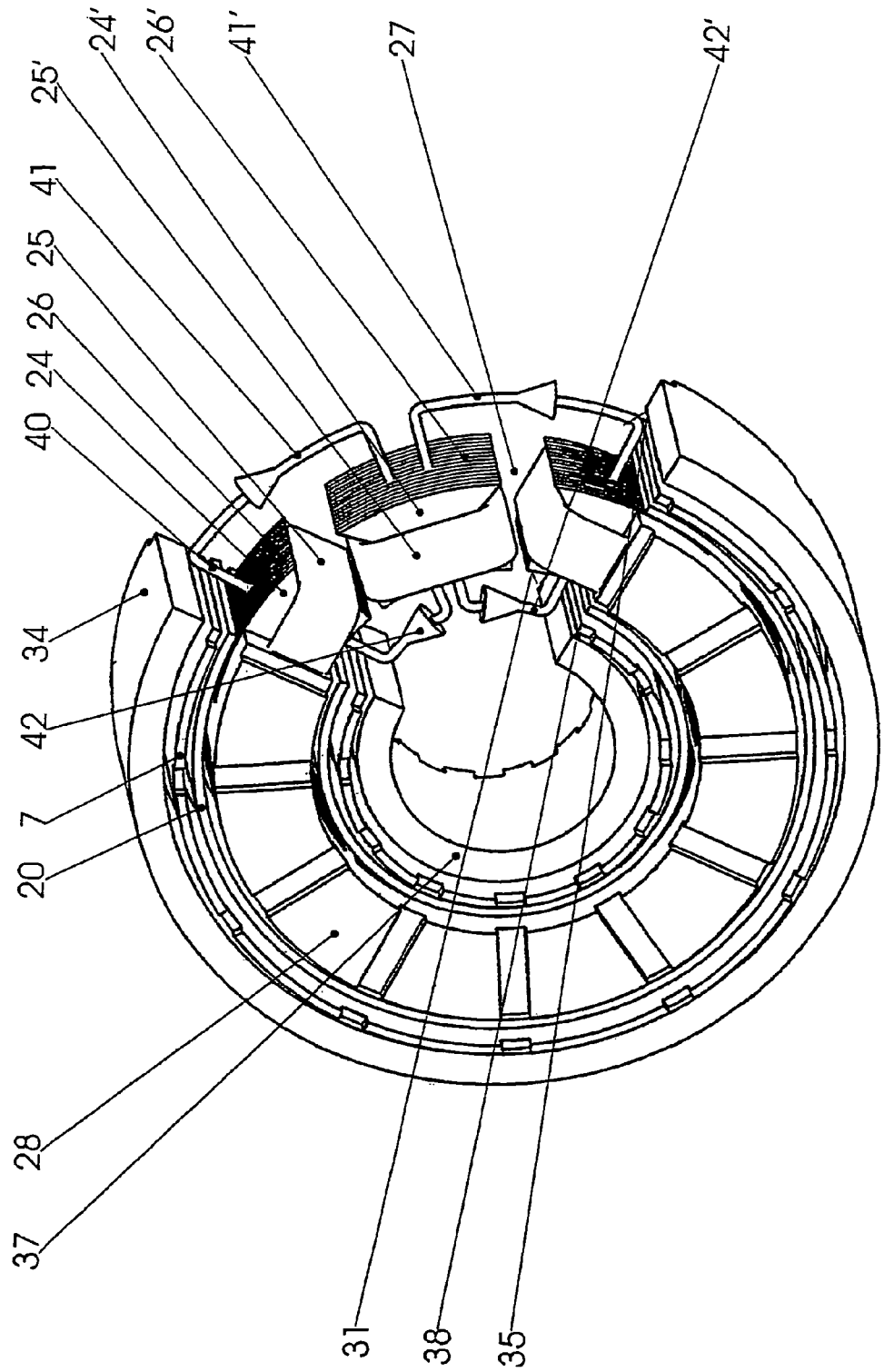
FIG. 3 is an axonometric view of FIG. 1.
Figure 7:
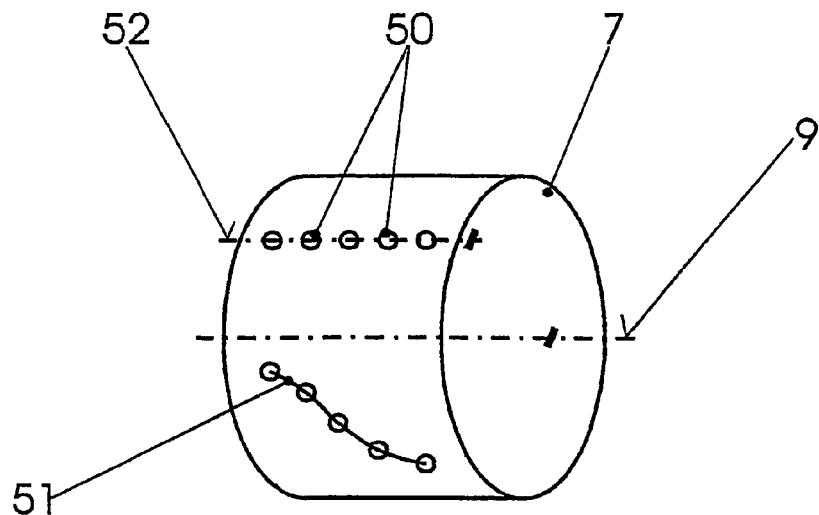
FIG. 7 illustrates a first embodiment of the lamination bands.
Figure 8:
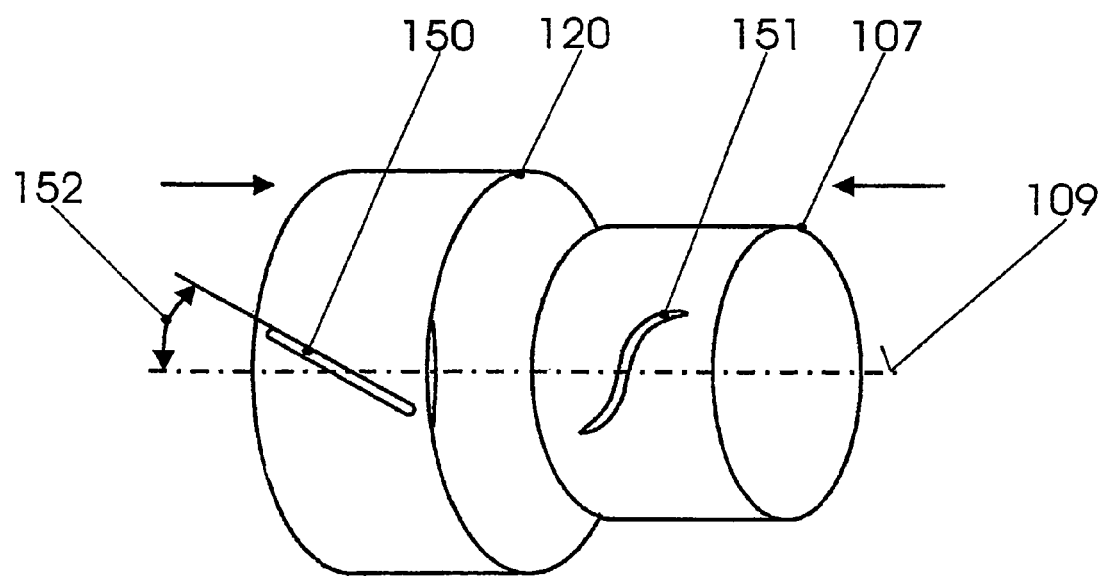
FIG. 8 illustrates a second embodiment of the lamination bands.

In FIG. 7, two different embodiments of the zones of low magnetic permeability are shown at a primary lamination band 7. The holes 50 are arranged along a line 52 which is a generatrix of the lamination band 7 and is parallel to the axis of rotation 9. The row 51 is a helix. In FIG. 8, a primary lamination band 107 and a secondary lamination band 120 are shown on which slits 150, 151 are provided instead of the rows of holes. The slit 150 is inclined at an acute angle 152 to the generatrix of the lamination band 120. The slit 151 follows a helix; its extent differs from that of the slit 150. Because slit 150 is inclined at an acute angle 152 and slit 151 follows a helix, a point of intersection migrates in the direction of the axis 109. The zones of low magnetic permeability reduce or eliminate magnetic short circuit inside the lamination bands. The zones of low magnetic permeability shown in FIGS. 7 and 8 reduce or eliminate the possibility of lines of magnetic flux acting against one another traversing across and inside the lamination bands as opposed to passing through the bands as depicted in FIG. 2. The described rows of holes or slits are each distributed over the whole periphery of the lamination bands at specific intervals, although always only one single row or one single slit is shown in FIGS. 7 and 8.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. A magnetorheological clutch, comprising:
   a stationary part;
   a primary part having primary lamination bands and a secondary part having secondary lamination bands wherein at least one of the primary part and the secondary part coaxially rotates relative to the respective other part, with a working space containing a magnetorheological fluid being formed in which primary lamination bands and secondary lamination bands alternate sequentially in the radial direction, and with a regulatable magnetic field acting on the magnetorheological fluid,
   a number of magnetic coils each having a first yoke and a substantially radial winding axis are arranged in the working space and distributed over a first yoke ring periphery, with adjacent magnetic coils being oppositely poled; and
   an outer second yoke and an inner second yoke bounding the working space outwardly and inwardly radially outside and radially inside the first yokes, with the magnetic field lines entering radially into the second yokes and emerging out of them again radially in the opposite direction,
   wherein the first yokes have cylindrical end faces out of or into which magnetic field lines substantially emerge or enter in a radial direction, with an axis of curvature of the cylindrical end faces being co-axially aligned with an axis of rotation of the clutch,
   the primary lamination bands and the secondary lamination bands being closed cylindrical jackets,
   the primary lamination bands and the secondary lamination bands being arranged radially outside and radially inside the first yokes, and
   wherein the outer second yoke has an inner cylindrical surface parallel and coaxial to the lamination bands and the inner second yoke has an outer cylindrical surface parallel and coaxial to the lamination bands.

2. A magnetorheological clutch in accordance with claim 1, wherein at least one of the first yokes and the second yokes is composed of metal sheets or comprise a sintered material of high magnetic permeability.

3. A magnetorheological clutch in accordance with claim 1, wherein the first yokes are rotationally fixedly connected to the primary part and the second yokes are rotationally fixedly connected to the secondary part and wherein lines are provided in the primary part for the power supply to the magnetic coils.

4. A magnetorheological clutch in accordance with claim 1, wherein the lamination bands comprise a material of high magnetic permeability and have zones of low magnetic permeability distributed over their periphery and extending in the axial direction.

5. A magnetorheological clutch in accordance with claim 4, wherein the zones of low magnetic permeability comprise rows of sequential holes.

6. A magnetorheological clutch in accordance with claim 5, wherein the rows of sequential holes are steep helixes.

7. A magnetorheological clutch in accordance with claim 5, wherein the extent of the zones of low magnetic permeability of the primary lamination bands differs from that of the zones of low magnetic permeability of the secondary lamination bands.

* * * * *